United States Patent [19]

Balliello et al.

[11] Patent Number: 4,465,491

[45] Date of Patent: Aug. 14, 1984

[54] SOLID DYE PREPARATION OF WATER SOLUBLE DYES WITH ALIPHATIC AMINOCARBOXYLIC ACID

[75] Inventors: Paolo Balliello, Rheinfelden, Fed. Rep. of Germany; Paul Erzinger, Liestal; Ernst Tempel, Riehen, both of Switzerland

[73] Assignee: Ciba-Geigy Corporation, Ardsley, N.Y.

[21] Appl. No.: 515,444

[22] Filed: Jul. 20, 1983

Related U.S. Application Data

[63] Continuation of Ser. No. 339,924, Jan. 18, 1982, abandoned.

[51] Int. Cl.$^3$ .......................... C09B 67/24; D06P 1/64
[52] U.S. Cl. .......................................... 8/524; 8/597; 8/676; 8/681
[58] Field of Search ..................... 8/524, 597

[56] References Cited

U.S. PATENT DOCUMENTS 2,708,193  5/1955  Pfitzner et al. ................... 260/147
2,834,773  5/1958  Scalera et al. ................... 260/148
3,963,418  6/1976  Tullio ................................ 8/527
4,014,646  3/1977  Tullio ................................ 8/586
4,058,480  11/1977 Lohmann et al. ................. 8/524
4,245,995  1/1981  Hugl et al. ........................ 8/574

FOREIGN PATENT DOCUMENTS 2410687  9/1975  Fed. Rep. of Germany .
53-70176  6/1978  Japan .
54-149732 11/1979 Japan .
55-104359 8/1980  Japan .

Primary Examiner—A. Lionel Clingman
Attorney, Agent, or Firm—Edward McC. Roberts

[57] ABSTRACT

The solid dye preparations contain
(a) 30–90 percent by weight of a water-soluble dye,
(b) 1–25 percent by weight of an aliphatic aminocarboxylic acid or a salt thereof, and
(c) 0–50 percent by weight of further additives.

There is preferably at least 2% of anionic dispersing agent in the preparations.

The preparations are particularly suitable for dyeing textile material made from cotton, polyacrylonitrile, wool or synthetic polyamide.

14 Claims, No Drawings

SOLID DYE PREPARATION OF WATER SOLUBLE DYES WITH ALIPHATIC AMINOCARBOXYLIC ACID

This application is a continuation of application Ser. No. 339,924, filed Jan. 18, 1982, now abandoned.

The present invention relates to solid dye preparations, to a process for producing them, and to their use for dyeing or printing textile material.

Solid dye preparations of water-soluble, anionic and cationic dyes are already known. These preparations usually contain the dye as well as further additives, for example dispersing agents, in most cases one of anionic or nonionic nature, diluting agents, wetting agents, and so forth. These preparations, however, frequently have disadvantages, such as inadequate solubility in cold water, insufficient redispersibility and/or wettability.

It is the object of the present invention to provide dye preparations not having the stated disadvantages. This objective has been achieved by provision of the solid dye preparations according to the invention, which contain
(1) 30–90 percent by weight of a water-soluble dye,
(2) 1–25 percent by weight of at least one aliphatic aminocarboxylic acid selected from the group:
  (a) an aliphatic mono-α-amino acid,
  (b) a monoiminopolycarboxylic acid,
  (c) a bis-α-iminocarboxylic acid of the formula I

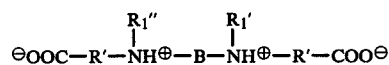

wherein
R' is a bivalent, aliphatic radical having 1 to 7 C atoms, particularly the group

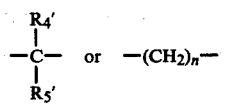

wherein
n is a number from 1 to 3,
$R_1'$ and $R_1''$ are independently hydrogen, —R'—COOH, or an aliphatic radical ($C_1$–$C_{12}$) which can be substituted by hydroxyl, alkylamino and alkoxy,
$R_4'$ and $R_5'$ are each independently hydrogen or ($C_1$–$C_5$) alkyl,
B is the direct bond, or a bivalent aliphatic radical selected from an ether or thioether radical, —CH$_2$—,

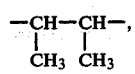

and —(CH$_2$)$_q$—, wherein
q is an integer from 3 to 6, and when $R_1'$ and/or $R_1''$ are each hydrogen, q can also be 2,
(d) a polyethyleneimine-N-polyacetic acid,
(e) a linear betain, or
(f) an alkali salt of any one of these compounds, and
(3) 0–50 percent by weight of further additives.

These products surprisingly exhibit very good solubility in cold water and have very good wetting properties, and they are moreover fully satisfactory with regard to their redispersibility. Further advantages which the dye preparations according to the invention have over known preparations of these dyes are the increased bulk density and also the possibility of being able to dry them by spray drying, whereas previously drying has had to be performed in a paddle dryer, in the course of which an undesirable transformation into a crystalline structure often occurs.

Suitable water-soluble dyes are for example acid and basic dyes, such as metal-complex dyes, chrome dyes, developing dyes and mordant dyes, as well as reactive dyes.

Anionic dyes which can be used are for example: anionic nitro, aminoketone, ketoimine, methine, nitrodiphenylamine, quinoline, aminonaphthoquinone or coumarin dyes, and in particular anthraquinone dyes and metal-containing or metal-free azo dyes, such as monoazo, disazo and polyazo dyes.

The term 'dyes' within the scope of the invention also embraces optical brighteners. Suitable brighteners are for example the following classes of compounds: stilbenes, coumarins, benzocoumarins, pyrenes, pyrazines, pyrazolines, oxazines, mono- or dibenzoxazolyl or mono- or diimidazolyl compounds, aryltriazole and v-triazole derivatives, as well as naphthalic acid imides.

The anionic dyes contain at least one water-solubilising group, for example a carboxylic acid group or especially a sulfo group.

Particularly suitable are azo or anthraquinone dyes having at least one sulfo group, and among these especially those which additionally contain at least one methoxy, amino, $C_1$–$C_6$-alkylamino or di-($C_1$–$C_6$)-alkylamino group.

The reactive dyes contain at least one reactive group, that is to say, a group which reacts, under dyeing conditions, with the textile material to form a covalent bond. Reactive groups are for example: aliphatic reactive radicals, such as the acryloyl, vinylsulfonyl, β-sulfatoethylaminosulfonyl, haloacryloyl, halopropionyl or haloacetyl radicals, halogen being in this case fluorine, or in particular bromine or chlorine.

Heterocyclic reactive radicals are for example: mono- chlorotriazinyl, dichlorotriazinyl, dichloroquinoxalinyl, di- or trichloropyrimidinyl, difluorochloropyrimidinyl or difluorotriazinyl, as well as fluorotriazinyl radicals of the formula

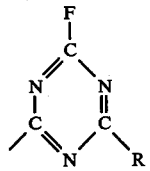

wherein R is an unsubstituted or substituted amino group, or a free or etherified oxy or thio group.

The dye preparations according to the invention preferably contain reactive dyes having a halotriazinyl group.

In the case of the water-soluble basic dyes, these are the customary salts and metal halide double salts, for example zinc chloride salts, of known cationic dyes, especially of methine or azamethine dyes, which contain for example an indolinium, pyrazolium, imidazolium, triazolium, tetrazolium, oxadiazolium, thiodiazolium, oxazolium, thiazolium, pyridinium, pyrimidinium or pyrazinium ring.

The heterocycles used can be unsubstituted or substituted and/or condensed with aromatic rings. Also suitable are cationic dyes of the diphenylmethane, triphenylmethane, oxazine, thiazine and 1,2-pyrane series, and finally also dye salts of the arylazo and anthraquinone series.

The dyes can optionally be in admixture with one another, or with dyes of another type.

The dyes usable according to the invention are known, and can be produced by known methods.

The aliphatic aminocarboxylic acids and salts thereof usable according to the invention are compounds containing several functional groups which can ionise in an aqueous solution, and can impart to the compounds anionic or cationic character, depending on the conditions of the medium.

Suitable aliphatic aminocarboxylic acids according to the invention are for example the compounds of the formula II:

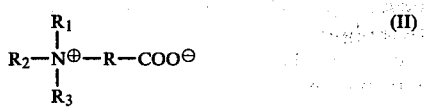

wherein
R is a bivalent aliphatic radical having 1 to 7 C atoms, particularly the group —CH$_2$—CH=CH—,

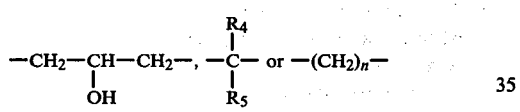

wherein
n is a number from 1 to 3,
R$_1$ is hydrogen, —R—COOH, or an aliphatic radical (C$_1$-C$_{12}$) which can be substituted by hydroxyl, alkylamino and alkoxy, for example octyl, hydroxyethyl or lower alkyl, preferably methyl,
R$_2$ is hydrogen,

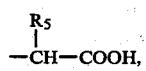

an aliphatic radical (preferably C$_1$-C$_{12}$) having a straight or branched chain which can be substituted by —COOH or —OH, or the group —(CH$_2$)$_n$—NH—CO—C$_p$H$_{2p+1}$ wherein n is an integer from 1 to 3 and p is an integer from 1 to 5, or the group

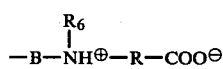

in which
B is the direct bond, or a bivalent aliphatic radical selected from an ether or thioether radical, and preferably —CH$_2$—,

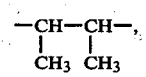

and —(CH$_2$)$_q$— wherein q is an integer from 3 to 6, and when R$_1$ and/or R$_6$ are hydrogen, q can also be 2, and when R$_1$, R$_3$, R$_4$ and R$_5$ are each hydrogen, R$_2$ can also be

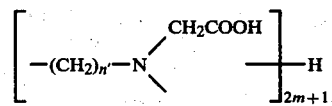

wherein n' is a number from 1 to 3, preferably 2, and m is an integer from 1 to 10, preferably from 2 to 8,
R$_3$ is hydrogen or methyl,
R$_4$ is hydrogen or alkyl (C$_1$-C$_5$),
R$_5$ is hydrogen or an aliphatic radical, (preferably C$_1$-C$_5$-alkyl) having a straight or branched chain which can be substituted by alkylamino, alkoxy, —COOH and/or —OH,
R$_6$ is hydrogen, —R—COOH, or (C$_1$-C$_{12}$)-alkyl which can be substituted by hydroxyl, alkylamino and alkoxy, for example methyl, octyl or hydroxyethyl.

These compounds are in particular those of the following classes:

A. Aliphatic mono-α-amino acids, for example those of the formula III

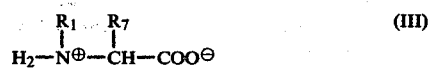

wherein
R$_1$ is hydrogen or methyl, and
R$_7$ is hydrogen, an aliphatic radical having a straight or branched chain which can be substituted by —OH, preferably —(CH$_2$)$_2$—OH or C$_1$-C$_5$-alkyl.
A preferred compound of this class is glycine.

B. Monoiminopolycarboxylic acids, for example those of the formula IVa

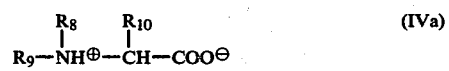

or of the formula IVb

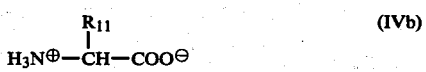

wherein
R$_8$ is

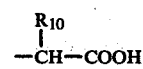

or —(CH$_2$)$_2$COOH,
R$_9$ is hydrogen,

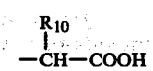

or C$_1$-C$_{12}$-alkyl, R$_{10}$ is hydrogen, an aliphatic radical (preferably C$_1$-C$_5$-alkyl) having a straight or branched chain which can be substituted by —COOH and/or —OH, and $R_{11}$ is an aliphatic radical (preferably $C_1$-$C_5$-alkyl) having a straight or branched chain which is substituted by —COOH and can also be substituted by —OH.

A preferred compound of this class is nitrilotriaacetic acid.

C. Bis-α-iminocarboxylic acids, particularly those of the formula Ia

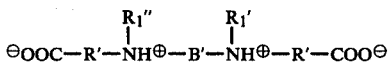

wherein

R' is a bivalent, aliphatic radical having 1 to 7 C atoms, particularly the group

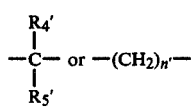

wherein n' is a number from 1 to 3, preferably 2, $R_1'$ and $R_1''$ are each independently hydrogen, —R'—COOH, or an aliphatic radical ($C_1$-$C_{12}$) which can be substituted by hydroxyl, alkylamino and alkoxy, $R_4'$ and $R_5'$ are each independently hydrogen or ($C_1$-$C_5$)alkyl, B' is the direct bond, or a bivalent aliphatic radical selected from —CH₂—, $$-CH-CH-,\atop CH_3\quad CH_3$$

and —(CH₂)$_q$— wherein q is an integer from 3 to 6, and when $R_1'$ and/or $R_1''$ are each hydrogen, q can also be 2.

D. Polyethyleneimine-N-polyacetic acids, for example those of the formula V

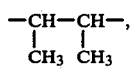

in which $R_{12}$ is

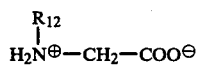

wherein n' is a number from 1 to 3, preferably 2, and m is an integer from 1 to 10, preferably from 2 to 8.

E. Linear betains, for example those of the formula VI

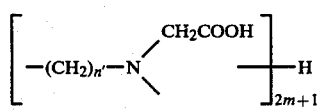

wherein

R'' is a bivalent aliphatic radical having 1 to 3 C atoms, especially —CH₂—CH=CH—,

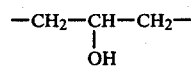

or preferably —(CH₂)$_n$— in which n is an integer from 1 to 3, $R_{13}$ and $R_{15}$ are each methyl, and $R_{14}$ is an unsubstituted or substituted aliphatic radical, especially having 1 to 12 carbon atoms, preferably —(CH₂)$_n$—NH—CO—$C_p$ $H_{2p+1}$ in which n is an integer from 1 to 3, and p is an integer, particularly 1 to 5.

A preferred example of this class is the compound of the formula

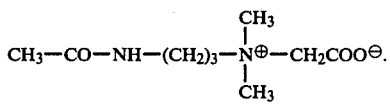

The aliphatic aminocarboxylic acids used according to the invention are known, and can be produced by known processes. The salts of these compounds are preferably the alkali salts thereof, especially the potassium and sodium salts. The preparations can also contain mixtures of two or more of these aliphatic aminocarboxylic acids.

The preparations can also contain further additives, such as customary diluting agents, for example dextrin, urea or inorganic salts, such as sodium chloride or sodium sulfate, as well as wetting agents, such as nonylphenoldiglycol ether sulfate or dodecylbenzene sulfonate, anionic and nonionic dispersing agents and/or antidusting agents.

The preparations according to the invention preferably contain 2-20 percent by weight, especially 3-10 percent by weight, of any one of the stated aliphatic aminocarboxylic acids or of salts thereof. Preferred preparations are those which additionally contain 2-50 percent by weight of an anionic dispersing agent.

The anionic dispersing agents used are the customary dispersing agents for anionic dyes, for example condensation products of aromatic sulfonic acids with formaldehyde. particularly suitable are however lignin sulfonates, for example the compounds obtainable under the name of powdered sulfite waste liquor. It is also possible to use mixtures of these dispersing agents.

The solid dye preparations according to the invention are produced for example by suspending a water-soluble dye in water, adding an aliphatic aminocarboxylic acid or a salt thereof, and optionally further additives, and mixing and preferably grinding the constituents with each other. The solution or suspension obtained is subsequently dried, preferably by spray drying.

The dyes or optical brighteners can be used, for example as a dried product or as press cake, or preferably from the final synthesis stage, directly from the solution, dispersion or suspension, before isolation, for example after completion of coupling.

When the mixture is ground, a proportion of the constituents can be added after grinding. It is also possible to first mix a portion of the constituents together, and to then add the rest, for example the antidusting agent, at the end of processing, for example after drying. It is however advantageous to add the aminocarboxylic acid usable according to the invention before grinding. The viscosity in many cases is lowered as a result. The grinding time is shortened or the grinding operation rendered superfluous in some cases as a result of the addition of the aminocarboxylic acid usable according to the invention.

The dye preparations according to the invention are used for the preparation of dye baths, padding liquors or printing pastes. These are suitable for dyeing or printing in particular textile material, for example that made from cellulose material or polyacrylonitrile, and from natural and especially synthetic polyamide.

The Examples which follow serve to further illustrate the invention. The term 'parts' denotes parts by weight, and percentages are percent by weight.

EXAMPLE 1

(a) 63.8 parts of the crude dye of the formula

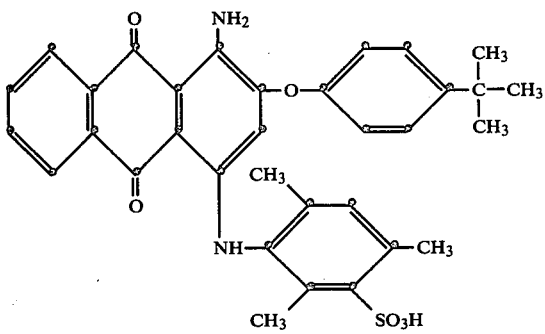

are suspended in about 150 ml of water; there are then added 19.3 parts of naphthalenesulfonic acid/formaldehyde condensation product (sodium salt), 4.8 parts of ethylenediaminetetraacetic acid (sodium salt) and 12.1 parts of the amphoteric auxiliary of the formula

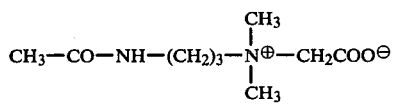

and the suspension obtained is ground for three hours in a ball mill. The suspension is subsequently spray dried. The result is a dye preparation which is readily soluble to the extent of more than 30 g/l in cold water, which has good wetting and redispersion properties, and which is excellently suitable, using customary methods, for dyeing or printing textile material made from polyamide.

DETERMINATION OF COLD-WATER SOLUBILITY (CWS) OF THE DYE PREPARATION (SUSPENSION METHOD)

6 g of the dye preparation to be tested are suspended in 6 g of industrial water in a 400 ml beaker. Further water is then added up to a total of 200 g, and stirring with a magnetic stirrer (40×7 mm, at 750 r.p.m.) is maintained for 120 seconds. The liquor produced in this manner is then filtered through a double-layer paper filter (SS 1450 CV, diameter 7 cm).

A preparation is then classed as being cold-water soluble when, after the above-described test method, no residue is left on the paper filter or in the beaker.

EXAMPLE 2

When the procedure is carried out as described in Example 1 except that the amphoteric auxiliary is replaced by an equivalent amount of glycine, a dye preparation having similarly good properties is obtained.

EXAMPLE 3

Using the procedure described in Example 1, there is produced the easily redispersible, readily wettable, cold-water soluble dye preparation of the following composition: 51.2% of the crude dye of the formula

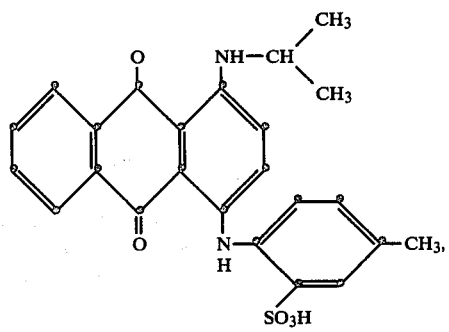

23.6% of sulfite waste liquor,
15.1% of glycine,
5.1% of wetting agent (alkylbenzimidazole derivative), and
5.0% of water.

EXAMPLE 4

The easily redispersible, readily wettable, cold-water soluble dye preparation of the following composition is produced using the procedure described in Example 1: 85.1% of the crude dye of the formula

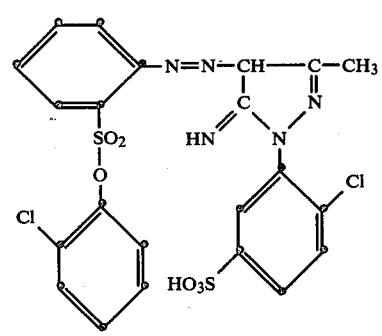

4.0% of ethylenediaminetetraacetic acid (sodium salt),
4.0% of glycine,
2.0% of NaCl, and
4.9% of water.

EXAMPLE 5

289.9 parts of press cake of the brightener of the formula

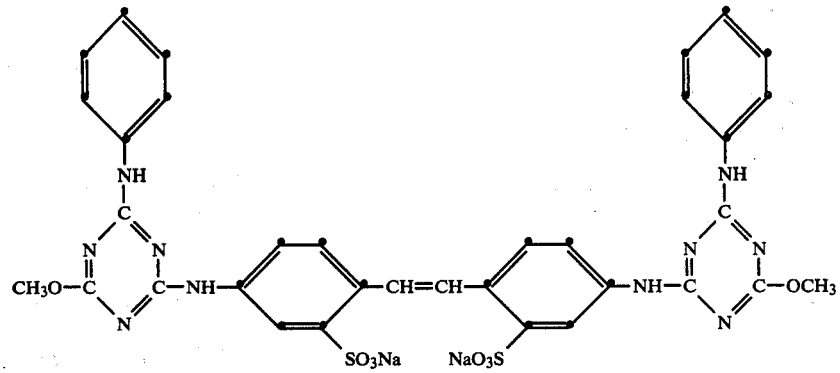

(containing 100 parts of active substance) are suspended in about 100 parts of water, and, with stirring, 1 part of lignin sulfonate (sodium salt) and 4.4 parts of glycine are added. The low-viscous slurry obtained is subsequently spray dried. A brightener preparation which is readily soluble in cold water and which has good wetting and redispersing properties is thus obtained.

When the amphoteric auxiliary or aminocarboxylic acid is not used in the above dye preparations, the minimum requirement with respect to cold-water solubility of 30 g/l at 20° C. at a dissolving rate of 120 seconds is not achievable.

What is claimed is:

1. A dyestuff granulate, readily soluble in cold water and containing (1) 30–90 percent by weight of an anionic dye containing at least one water-solubilizing group, (2) 1–25 percent by weight of a compound of the formula

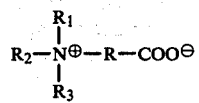

or an alkali salt thereof wherein

R is a bivalent aliphatic radical having 1 to 7 C atoms, $R_1$ is hydrogen, —R—COOH, or an aliphatic radical ($C_1$–$C_{12}$) which is unsubstituted or substituted by hydroxyl, alkylamino or alkoxy, $R_2$ is hydrogen, an aliphatic radical ($C_1$–$C_{12}$) which is unsubstituted or substituted by hydroxyl; or the group —(CH$_2$)$_n$—NH—CO—C$_p$H$_{2p+1}$ wherein n is an integer from 1 to 3 and p is an integer from 1 to 5, or the group

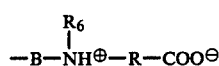

in which

B is a direct bond, or a bivalent aliphatic radical selected from an ether or thioether radical, —CH$_2$—,

—CH—CH—,
| |
CH$_3$ CH$_3$ and —(CH$_2$)$_q$— wherein q is an integer from 3 to 6, and when $R_1$ and/or $R_6$ are hydrogen, q can also be 2, and when $R_1$ and $R_3$ are each hydrogen, $R_2$ can also be

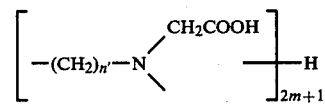

wherein n' is a number from 1 to 3, and m is an integer from 1 to 10, $R_3$ is hydrogen or methyl, $R_6$ is hydrogen, —R—COOH, or ($C_1$–$C_{12}$)-alkyl which is unsubstituted or substituted by hydroxyl, alkylamino or alkoxy, and (3) 0–50 percent by weight of further additives, which granulate is obtained forming an aqueous mixture of the constituents (1) to (3) and spray drying said mixture.

2. A preparation according to claim 1, which contains 2–50 percent by weight of an anionic dispersing agent.

3. A preparation according to claim 2, which contains 2–20 percent by weight of component (2).

4. A preparation according to claim 3, which contains 3–10 percent by weight of component (2).

5. A preparation according to claim 1, in which R is a bivalent aliphatic radical having 1 to 7 C atoms selected from —CH$_2$—CH=CH—,

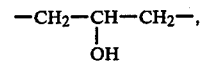

and —(CH$_2$)$_n$— wherein n is a number from 1 to 3, and $R_4$ and $R_5$ are hydrogen of ($C_1$–$C_5$)-alkyl.

6. A preparation according to claim 1, wherein component (2) is an aliphatic mono-α-amino acid of the formula

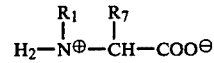

wherein $R_1$ is hydrogen or methyl, and $R_7$ is hydrogen, an aliphatic radical ($C_1$–$C_5$) having a straight or branched chain which is unsubstituted or substituted by —OH.

7. A preparation according to claim 6, wherein $R_1$ is hydrogen or methyl, and $R_7$ is —$(CH_2)_2$—OH or $C_1$–$C_5$-alkyl.

8. A preparation according to claim 1, wherein component (2) is a bis-α-iminocarboxylic acid of the formula

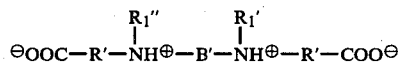

wherein

R' is the group

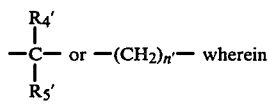

n' is a number from 1 to 3, $R_1'$ and $R_1''$ are each independently hydrogen, —R'—COOH, or an aliphatic radical ($C_1$–$C_{12}$) which can be substituted by hydroxyl, alkylamino and alkoxy, $R_4'$ and $R_5'$ are each independently hydrogen or ($C_1$–$C_5$) alkyl, B' is the direct bond, or a bivalent aliphatic radical selected from —$CH_2$—, $$-CH-CH-,$$
$$\phantom{-}|\phantom{CH-C}|$$
$$\phantom{-}CH_3\phantom{-}CH_3$$

and —$(CH_2)_q$— wherein q is an integer from 3 to 6, and when $R_1'$ and/or $R_1''$ are each hydrogen, q can also be 2.

9. A preparation according to claim 8, wherein B' is —$CH_2$— or —$(CH_2)_q$.

10. A preparation according to claim 1, wherein the aliphatic aminocarboxylic acid is a polyethyleneimine-N-polyacetic acid of the formula

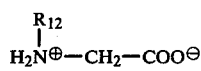

in which $R_{12}$ is

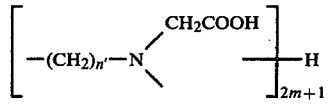

wherein n' is a number from 1 to 3, and m is an integer from 1 to 10.

11. A preparation according to claim 1, wherein the component (2) is a linear betain of the formula

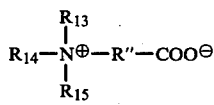

wherein

R'' is a bivalent aliphatic radical having 1 to 3 C atoms, $R_{13}$ and $R_{15}$ are each methyl, and $R_{14}$ is an aliphatic radical having 1 to 12 carbon atoms which is unsubstituted or substituted by hydroxyl.

12. A preparation according to claim 11, wherein R'' is —$CH_2$—CH=CH—, $$-CH_2-CH-CH_2-$$
$$\phantom{-CH_2-}|$$
$$\phantom{-CH_2-}OH$$

or —$(CH_2)_n$ in which n is an integer from 1 to 3, $R_{13}$ and $R_{15}$ are methyl and $R_{14}$ is —$(CH_2)_n$—NH—CO—$C_pH_{2p+1}$ in which n is an integer from 1 to 3, and p is an integer from 1 to 5.

13. A preparation according to claim 1, wherein the dye contained is an azo or anthraquinone dye having at least one sulfo group.

14. A preparation according to claim 13, wherein the dye contained is an azo or anthraquinone dye having at least one sulfo group, which additionally contains at least one methoxy, amino, $C_1$–$C_6$-alkylamino or di-($C_1$–$C_6$)-alkylamino group.

* * * * *